Aug. 15, 1950  C. NICOLLE  2,518,565
APPARATUS FOR SIMULTANEOUSLY PRODUCING MULTIPLE
RECESSES IN PLASTIC SHEET MATERIAL
Filed Aug. 13, 1945  4 Sheets-Sheet 1

INVENTOR
Charles Nicolle
By Watson, Cole, Grindle & Watson

Aug. 15, 1950 C. NICOLLE 2,518,565
APPARATUS FOR SIMULTANEOUSLY PRODUCING MULTIPLE
RECESSES IN PLASTIC SHEET MATERIAL
Filed Aug. 13, 1945 4 Sheets-Sheet 2

INVENTOR
Charles Nicolle
By Watson, Cole, Grindle
& Watson

Aug. 15, 1950 C. NICOLLE 2,518,565
APPARATUS FOR SIMULTANEOUSLY PRODUCING MULTIPLE
RECESSES IN PLASTIC SHEET MATERIAL
Filed Aug. 13, 1945 4 Sheets-Sheet 4

INVENTOR
Charles Nicolle

By Watson, Cole, Grindle
 & Watson

Patented Aug. 15, 1950

2,518,565

UNITED STATES PATENT OFFICE 2,518,565

APPARATUS FOR SIMULTANEOUSLY PRODUCING MULTIPLE RECESSES IN PLASTIC SHEET MATERIAL

Charles Nicolle, Gentilly, France

Application August 13, 1945, Serial No. 610,622
In France January 4, 1944

Section 1, Public Law 690, August 8, 1946
Patent expires January 4, 1964

15 Claims. (Cl. 18—19)

My invention has for its object an apparatus for the mass production of multiple impressions in thin sheets or strips of acetate of cellulose or the like equivalent plastic material which may be stamped to shape when heated.

It is known that for the shaping of sheets of plastic material adapted to be deformed when hot, the usual method consists in previously heating these sheets in furnaces or on plates or by means of special radiating apparatuses or other suitable means after which they are transported as speedily as possible on to heated or unheated dies or matrices which are then closed immediately so as to take advantage of the softened state of the material which allows same to assume the desired shape after which the sheets are allowed to cool before removal.

Such a method is not applicable to very thin sheets such as those for which the apparatus according to the present invention has been specially designed. As a matter of fact, if such sheets are adapted to be instantaneously heated throughout their mass or at least throughout the major part of their mass, i. e., the part which is to be submitted to the desired deformation, they immediately lose the heat received as soon as they are no longer in contact with or in the presence of the source of heat, so that in practice such thin sheets become again more or less rigid by reason of their contact with the ambient air and, at the moment at which they are in the presence of the dies or matrices, they are either completely returned into their rigid state or much less plastic which leads of necessity during the stamping to a tearing of the material which is no longer deformable or which is no longer sufficiently deformable.

Moreover, handling of sheets which are as thin as paper sheets and which are softened by heat is almost impossible. If, on the contrary, the sheets are kept stationary and the apparatus is moved towards them, this leads to more intricate arrangements and to useless complementary stresses due to the greater weight which is to be moved.

Lastly, it is often found that when pressure is exerted at any point of a flat sheet held by means of its edges, folds are formed around the point at which the pressure is exerted; these folds give rise to overthicknesses of material which impart undesired rigidity to the material at these points, prevent its sliding and consequently produce an immediate breaking.

My invention has for its object to remove these drawbacks and at the same time it aims at:

(a) Obtaining in a single operation in the same sheet or film a plurality of stamped impressions.

(b) Allowing the drawing of the sheet to be executed to a maximum so as to obtain eventually very deep impressions, although the latter are executed in a same sheet or strip and are not independent from one another.

(c) Controlling the forces exerted on the sheet of plastic material so as to avoid the initiation of any folds at any point during the drawing operation.

(d) Allowing a reduction to a minimum of the intervals between adjacent impressions.

(e) Allowing the recessed portions of the sheets to retain a yieldingness comparable with that of the sheets themselves.

(f) Retaining perfect transparency of the sheets in the case of transparent sheets.

(g) Lastly, in providing for a maximum output by means of a simple apparatus having a small bulk with a minimum number of operators, say one per apparatus or two for coupled apparatuses or a double-acting apparatus.

All these advantages show a considerable improvement over all that it has been possible to achieve heretofore with sheets of cellulose acetate having a thickness of a few hundredths of a millimeter.

The apparatus proposed by my invention with a view to achieve the above described result, is chiefly characterized by the fact that thin sheets or strips of acetate of cellulose or the like plastic material are inserted while cold in apparatus heated to temperatures which are held constant, in which they are instantaneously heated throughout their mass and at all points thereof and by the fact that said sheets are simply drawn in a progressive manner during a continuous operation; all portions of these sheets or strips including the unrecessed portions located between the recessed portions take part in this drawing and cooperate in the formation of the impressions. There is thus no time lost between the preheating and the drawing operations.

The apparatus is moreover characterized by the fact that, during deformation, the aforesaid sheet is left free on one of its faces and is not compressed between two hot surfaces, the drawing being realised by only one set of devices placed on one side only of the strip or sheet.

The apparatus is moreover characterized by the fact that during the complete cycle of operation, the sheet remains under the permanent action of suitably adjusted sources of heat acting through direct contact with heated metallic parts, through radiation or otherwise or through the agency of the hot atmosphere produced in chambers or spaces closed by the sheet itself.

According to a still further feature of the apparatus, the sheets or strips of cellulose acetate may not be heated in a uniform manner throughout their extent, the parts submitted to a greater deformation being brought to a temperature different from that assumed by the remainder of the strips or sheets.

My invention has for its object an apparatus showing the following principal characteristic features which may be considered singly or in any desired associations:

1. The apparatus includes three distinct chief parts: a matrice or die including perforated elements the outline of which is that of the impression to be obtained, a countermatrice or cover plate constituted by a plate similar to the matrice, and a series of drawing pistons adapted to slide freely through the perforated elements of the cover plate and the free ends of which or the peripheries of said ends are designed so as to conform with the exact shape and size of the inside of the recesses to be executed.

2. The drawing pistons are rigid with a common supporting plate.

3. The drawing pistons are removable.

4. The distal ends of these drawing pistons may be constituted by a removable part.

5. Each of the three abovementioned parts or systems of parts is provided with its own independent and adjustable heating means the temperature of which is accurately controllable.

6. The piston-carrying plate is rigid with the slide block of a hand operated press or the like while the cover plate is mounted on the piston-carrying plate through the agency of an adjustable yielding connection.

7. Adjustable wedges or stops are inserted between the plate carrying the drawing system and the cover plate for allowing an adjustment of the depth of the impressions.

8. In a modification, the countermatrice or cover plate is stationary while the matrix or die is movable and its movements are associated with those of the drawing pistons.

9. Inside the perforated elements of the matrice may slide heating pistons the outline of which corresponds to that of said perforated elements, said pistons being adapted, if required, to serve for the ejection of the finished recessed sheet.

10. These heating pistons are connected in an adjustable manner to a common supporting and operating plate.

11. The plate carrying the drawing pistons which is integral with the slide block of the operating press, controls in its turn through the agency of a control rod carrying suitable bosses and stops, the plate carrying the heating pistons, yielding systems being inserted in said transmission.

12. Locking means are provided for locking, at the desired moment, the heating pistons in their lower position.

13. The die or cover plate may include very slightly raised edges in order to prevent too great a compression of the sheet of plastic material between said two parts.

14. It is also possible to provide preferably removable bars at the edges of the die or cover plate, said bars playing the same part and holding the edges of the sheets to be shaped or controlling the shrinking movement of said edges.

15. These bars may have a smaller height above the die or cover plate or may not extend at all therebeyond at the points corresponding to the perforated parts of said die or cover plate.

16. The apparatus may be a double acting apparatus. Other characteristic features and advantages of my invention will appear during the description following hereinafter with reference to accompanying drawings in which is shown diagrammatically and solely by way of example, a form of execution of the invention with certain modifications.

Figure 1:
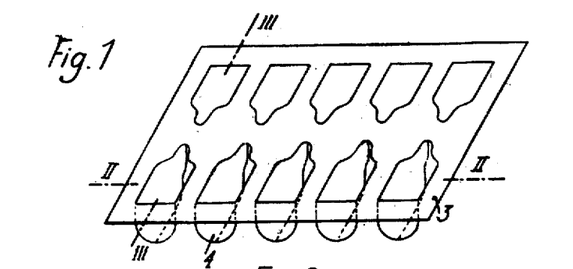
Fig. 1 is a perspective view of a recessed sheet of the type which may be obtained in accordance with my improved process and with the machine which forms the object of the invention.
Figures 2, 3, 12, 14, 16, 17:
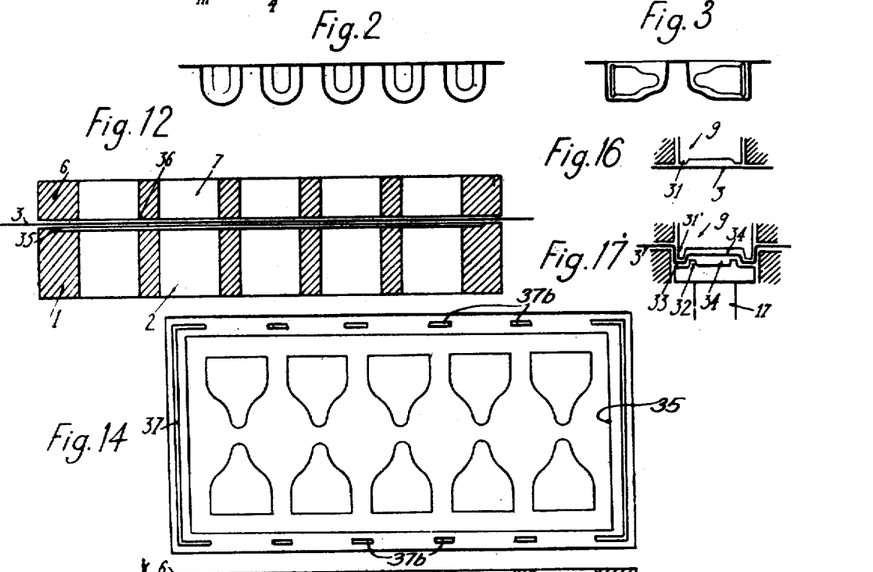
Fig. 2 is a transverse cross-section through line II—II of Fig. 1.
Fig. 3 is a transverse cross section through line III—III of Fig. 1 with objects placed inside the recesses.
Fig. 12 is a sectional view of a die and cover plate showing in exaggerated scale a feature of the invention which was omitted from the preceding figures for reasons of clarity.
Fig. 14 is a plan view of a die of the type used in the modification of Fig. 13.
Fig. 16 is a fragmentary view of a modification of the drawing piston adapted to be used in the machine.
Fig. 17 shows another modification of the drawing piston associated with a modification of the heating system also adapted for use in the machine.

In the example illustrated in the drawings, it has been assumed that it is desired to produce a sheet of acetate of cellulose starting from a thin sheet of this material having a thickness of say 12/100 of a millimeter, the recessed sheet being deformed to produce ten enclosures for nursing bottle caps or nipples, as illustrated in Figs. 1 to 3 merely by way of a non-limitative example.

Usually, for the production of such a sheet, one uses dies which have a hollow shape corresponding to the impressions to be provided and which are associated with cover plates of corresponding shape, said parts being spaced through the distance required for containing the material to be shaped. These dies and cover plates are heated in a manner such that the sheet is compressed between two heated metal surfaces which leads to serious drawbacks with respect to the resistance of the material for the thickness involved, said manner of operating producing, as it seems, a sort of baking which at any rate, as it may be easily found, produces a more or less considerable brittleness in the material. Moreover this compression or this tightening of the material between two heated metal surfaces shows also a serious drawback in the case of transparent sheets inasmuch as it leads to the appearance of a certain cloudiness loss of transparency.

The apparatus which forms the object of my invention allows these drawbacks to be removed through the fact that the sheet of material to be shaped is never held between two metal surfaces, heated or not, but is simply drawn by suitable parts; the sheet of acetate of cellulose is tensioned so to speak over the drawing parts somewhat after the manner of a rubber sheet; this allows the execution with such drawing parts of impressions or recesses provided with depressed portions as shown for instance in the case of the recesses illustrated in Figs. 1 to 3 and adapted to receive nursing bottle stoppers or nipples. Moreover, as already explained, the plate or sheet of acetate of cellulose is not submitted to a preliminary heating in the case of my improved method and is directly heated in the shaping apparatus and moreover its heating need not be uniform but can vary according to the point considered.

I will now describe by way of example a machine adapted to produce sheets such as that illustrated in Figs. 1, 2, 3, said machine allowing the execution of the method according to my invention, and forming the object of my invention. It should be noted that hereinabove, matrices or dies and countermatrices, cover plates or die plungers have been referred to and these will hereinafter be referred to as dies and cover plates for describing the machine, although in practice the elements considered are not matrices or dies and countermatrices, cover plates or die plungers in the usual acceptance of these words and these elements do not, as a matter of fact, in the preparation of the recessed plates, play an actual shaping part but merely a part consisting in securing bearing, holding back, guiding and heating the sheets to be shaped as the shaping part itself is played by drawing pistons which will be hereinafter described in greater detail.

The machine which forms the object of my invention includes a stationary die 1 formed of a simple flat plate provided with perforated portions 2 shaped in conformity with the outer outline of the desired recesses. In other words, this die 1 comprises no molding hollows against which the sheet of acetate of cellulose 3 may be adapted to bear and to be shaped. The die 1 includes as many similar perforated portions as there are impressions to execute at the same time; in the example shown, where it is desired to obtain a recessed sheet such as that of Fig. 1, there are ten perforated portions 2 arranged in two rows after the manner of the recesses 4 of the sheet 3. These perforated portions may be very near one another as illustrated, which is of considerable interest firstly from the standpoint of economy in material and secondly from the standpoint of bulk.

Figure 5:
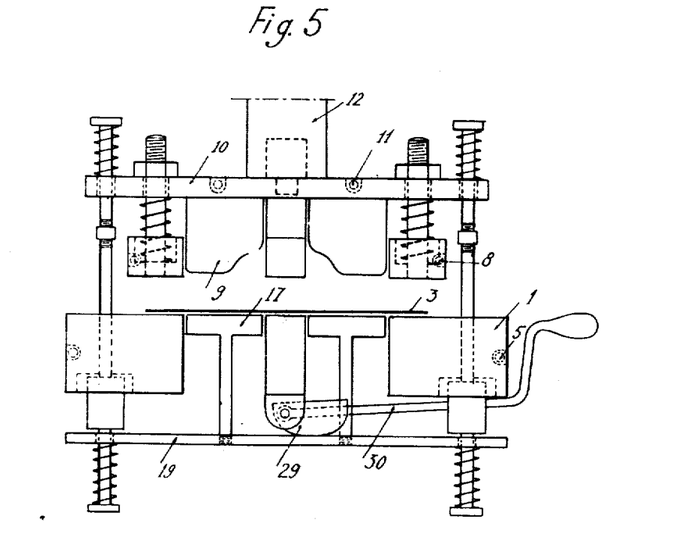
Fig. 5 is a vertical view through one end.

This die 1 is heated by electric resistances which are illustrated in diagrammatical manner at 5 in Fig. 5, said resistances being adjustable for instance by means of a rheostat, and being located in a manner such as will produce a uniform heating throughout the mass of the die. A thermometer or a temperature supervising device allows the observation of this temperature, its adjustment and, if required, its recording.

On the above described die may bear a cover plate 6 constituted by a plate similar to the plate forming the die and including the perforated parts 7 similar to those of the die and arranged in the same manner. This cover plate 6 is also heated by a circuit of electric resistances as illustrated at 8 in Fig. 5, said resistances being, like those of the die, adjustable while the temperature is observed through thermometers or the like suitable means.

The third chief element of the apparatus according to my invention consists of a series of drawing pistons 9 secured in any suitable manner to a supporting and controlling plate 10, said pistons 9 sliding freely inside the perforated portions 7 of the cover plate 6.

The free ends of the drawing pistons are designed so as to conform with the exact shape and size of the inside of the recesses 4 to be produced.

It should be noted that these pistons do not cooperate with similarly shaped counterpart portions of the die so that the sheets are never held tight between two metal parts while heated to softening temperature whereby consequently the smears leading to a clouding of the material at the point at which such a pressure might be exerted cannot be produced. Thus the sheets retain after drawing their remarkable transparency.

The drawing pistons are heated independently of the die and of the cover plate. They receive their heat through the plate 10 which is heated for instance by means of electric resistances 11 in an adjustable and controlled manner as in the case of the die 1 and of the cover plate 6.

Figure 4:
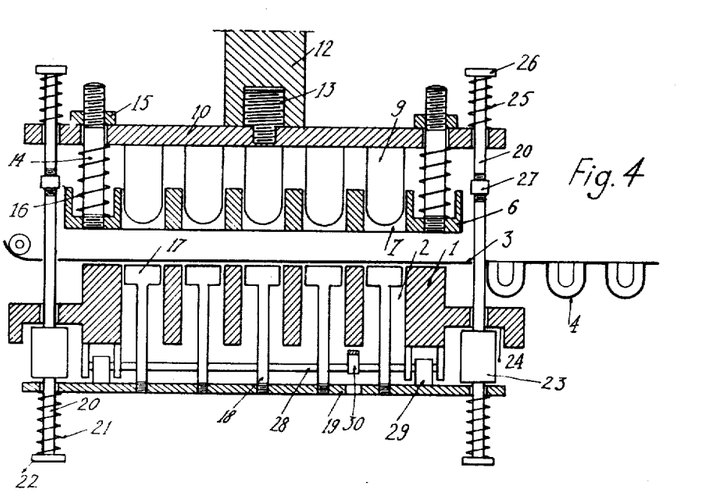
Fig. 4 is an elevational view, partly cross-sectional, of a machine constructed in accordance with my invention.

The plate 10 carrying the drawing pistons 9 is rigid with the slide 12 of the press a portion of the slide of which has been illustrated in Figs. 4 and 5. This press may be of any suitable type and may be hand controlled or controlled in any other suitable manner.

The cover plate 6 is also mounted on the supporting plate 10 for the drawing pistons. The arrangement of the cover plate and of the pistons forms consequently a movable system which rises and sinks at each operation, i. e., for each movement of the slide of the press, while the die 1 is stationary with reference to the bed of the press.

The piston-carrying plate 10 is secured to the slide 12 of the press in any suitable manner, for instance by means of a threaded part 13. The cover plate 6, the perforated portions 7 of which are engaged by the drawing pistons which slide freely therein, is carried by rods 14 adapted to slide through the plate 10; the upper end of those rods is threaded so as to allow the position of this plate to be adjusted with reference to the drawing pistons by means of the nuts 15.

Between the cover plate 6 and the supporting plate 10 of the drawing pistons are arranged interchangeable springs 16 the compressional power of which is known.

The die 1 which, as stated, is stationary is adjusted in a manner such that the drawing pistons 9 may register with the perforated portions 2 of said die.

Through these perforated portions, may slide moreover heating pistons 17 connected through rods 18 with a carrier plate 19 underneath the die. These heating pistons 17 are adjusted in a manner such that their upper flat elements may be flush with the upper face of the die when the machine is open as illustrated in Figs. 4 and 5. The plate 19 may slide over guiding and control rods 20 which may also slide through the plate 10 carrying the drawing pistons 9 but the plate 19 is held by springs 21 which are comparatively weak and are moreover adjustable through the nuts 22. The part played by these upwardly acting springs consists in raising to a maximum height the heating pistons 17, i. e., in urging them into a position flush with the upper surface of the die.

Each rod 20 includes an enlargement 23 arranged between the bottom of a recessed portion 24 forming a stop and the plate 19 carrying the heating pistons. At its upper part the rod 20 is associated with a yielding system constituted by a spring 25 bearing on one hand against the plate 10 carrying the drawing pistons and on the other against the adjusting nut 26. Lastly the rod 20 includes a stop 27 which may be adjustable.

The die 1 carries at its lower end a rod 28 carrying a series of cams 29 (see also Fig. 5). The rod 28 is rigid with a control lever 30. These cams are arranged between the lower part of the die 1 and the plate 19 carrying the heating pistons. The rod 28 is freely mounted in bearings which are secured to the die, in a manner such that when the plate 19 sinks and carries along with it the heating pistons 17 so as to allow the drawing pistons 9 to engage the recesses 2 of the die 1, the cams rotate downwardly under the action of gravity, the lever 30 forming moreover a counterweight. The cams, when they rotate downwardly, finally lock the machine in its closed position hereinafter as described.

The machine as described hereinabove allows in conformity with the method forming the object of my invention the formation in a single rapid operation of impressions in very thin sheets of acetate of cellulose having only a few hundredths of a millimeter thickness. Also in conformity with the machine forming the object of my invention, the three chief components of the apparatus, to wit the die 1, the cover plate 6 and the drawing pistons 9 are heated by three independent circuits which are adjustable independently from one another. It should be noted that the sheets of plastic material show different characteristic data according to their nature, i. e. according to their composition and the manner of producing them; for this reason, it is necessary to allow an adjustment of different predetermined values corresponding to the different cases, of the respective temperatures of the three chief components of the apparatus; for instance, certain sheets of acetate of cellulose are sufficiently soft at 75° C. whereas others require a temperature of 125° C.

According to a further characteristic feature of the machine forming the object of my invention, the three principal components of the machine are not brought to the same temperature. According to the depth of the recesses to be produced, according to the speed of operation which depends on the shape and depth of the impressions, and according to the thickness of the sheet of acetate of cellulose it is possible to make the three temperatures considered vary one with reference to the other. Other conditions have also an influence, to wit: the ambient temperature, the hygrometric state of the air, the age of the sheets, etc. These relative temperatures of the three principal elements of the machine one with reference to the other, are defined after taking into account the characteristic properties of the sheets to be treated and also the experience available in each case. In any case, by reason of the independent, adjustable and supervised electric circuits for the different elements of the machine, it is possible to provide at different points of the machine and at different points of the sheet for varying temperatures having the most suitable values and ensuring the best results.

I will now describe with reference to Figs. 6 to 11 the operation of the abovedescribed machine.

Figure 6:
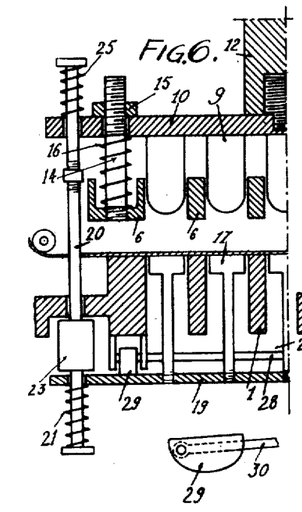
Figs. 6 to 11 show a portion of the machine illustrated in Fig. 4 in different operative positions, and set forth therebelow, by way of indication, the position of the locking cam of the apparatus.

In the position illustrated in Fig. 6, the machine is open and the thin sheet 3 of acetate of cellulose, wound off a cylinder, for instance, is placed in the machine. The slide 12 of the press is raised and retains the plate 10 of the drawing piston 9 and consequently these pistons 9 are held in their raised position. The cover plate 6 is also held raised by means of the rods 14 and of the nuts 15. By means of these nuts, it is possible to adjust the height of the cover plate 6 in a manner such that the lower part of the drawing pistons 9 does not come quite flush with the lower surface of the cover plate, the spacing being for instance between about 1 and 2 mm.

Inside the perforated parts 2 of the stationary die 1, the heating pistons 17 are flush with the upper level of the die into which they are raised by the plate 19 which is raised in its turn by the control rod 20 and by the spring 21; this rod 20 is raised itself by the plate 10 carrying the drawing pistons through the agency of the spring 25 while the two lower and upper shoulders of the enlargement 23 of said rod 20 form a double stop. The sheet 3 is thus inserted over an actual heating table without any gap, as the heating pistons fill the open parts of the die 1.

Figure 7:
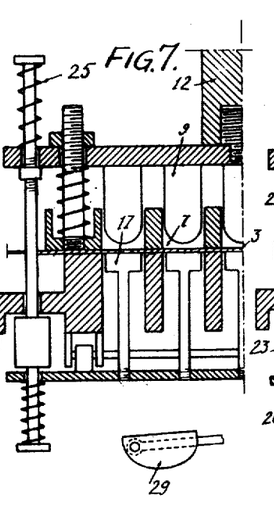

In the position illustrated in Fig. 7, the slide 12 of the press is lowered and therewith the upper movable portion of the machine. It will be noted that in this position, the cover plate bears against the sheet 3 whereas nothing has been altered as yet in the lower part of the machine. The sheet 3 is then heated in a perfect manner on its lower surface through its contact with the die 1 and the heating pistons 17, while its upper surface receives also heat through direct contact with the cover plate 6; moreover, the perforated parts of the cover plate afford, as illustrated at 7, hot chambers, the drawing pistons 9 being at this moment held slightly above the points of contact with the sheet 3. It is apparent that the heating pistons 17 are held in place under the action of the spring 25 which has expanded during the movement described. As the sheet of acetate 3 inserted in the apparatus is only a few hundredths of a millimeter thick, this sheet is heated at the very moment the machine is closed both above and underneath and throughout its mass and if the temperatures applied are suitable, it is exactly under the conditions suitable for its drawing, provided the latter is executed without any delay before the die is submitted to any transformation by reason of the heat.

Figure 8:
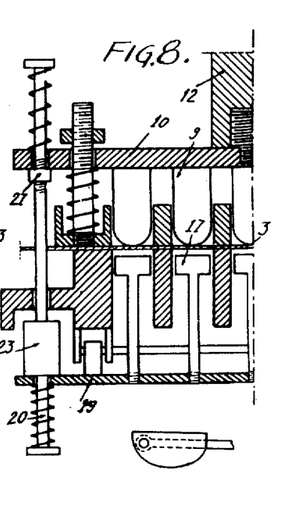

In Fig. 8, I have illustrated the position occupied by the different parts of the apparatus when the slide 12 has been lowered through a further distance of 1 or 2 mm. with reference to the position illustrated in Fig. 7. At this moment, the lower part of the drawing pistons 9 comes into contact with the sheet 3. But the heating pistons 17 have then begun moving downwards as shown in the figure so that the material is never held fast between two metallic parts and is on the contrary always held between two comparatively fluidtight hot chambers i. e. inside a perfect atmosphere for drawing purposes; the material of the sheet is moreover protected against any contact with the cold air which might be liable to make the material assume a rigid structure, ever since its first contact with the lower hot die over which it has been placed. It is apparent that in the position illustrated in Fig. 8, the sinking movement of the heating system 17 is controlled by the plate 19 which carries said pistons and is itself urged by the lower shoulder of the enlargement 23 of the rod 20, which latter is driven by the nut 27 under the action of the plate 10 carrying the drawing pistons 9.

Thus, from this moment onwards the sinking speed of the heating pistons 17 is equal to that of the drawing pistons 9, which has for its object to keep substantially constant the spacing between the heating pistons and the drawing pistons.

Figure 9:
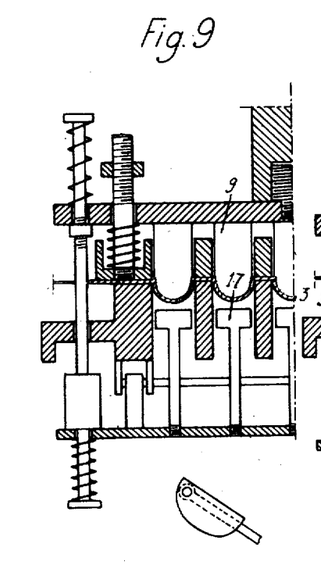

In Fig. 9, I have shown the position of the machine in a substantially more advanced stage. The heating pistons 17 continue sinking and the drawing pistons 9 begin forming their impression in the sheet 3.

Figure 10:
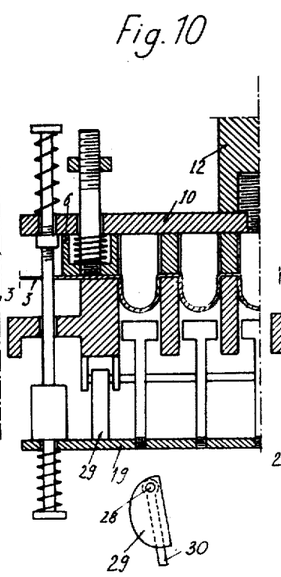

In Fig. 10, is illustrated the machine in the position assumed by the parts at the end of the stroke of the slide 12. At this moment, the plate 10 abuts against the cover plate 6 and locks the machine which is at the end of its stroke; the impressions are then entirely formed in the sheet 3.

The above description relating to the operation of the apparatus corresponds to an uninterrupted working. Said working is substantially a continuous one between the position shown in Fig. 6 and that shown in Fig. 10. It should be noted however that with certain thicknesses of material and with certain grades and according also to the shape desired for the impression, it is necessary:

1. To stop momentarily, say for a second or a fraction of a second, in the position illustrated in Fig. 7.

2. To execute the operations illustrated diagrammatically by the positions shown in Figs. 8, 9 and 10 at speeds which are not uniform and may, according to the particular case, increase or decrease.

It should be noted however that instead of providing the momentary stoppage as hereinabove, it is possible in certain cases to make the drawing pistons act with a certain delay while adjusting them say at a few millimeters from the lower surface of the cover plate instead of one or two millimeters as in the preceding case.

In fact, one of the numerous advantages of the above described machine consists in allowing all these conditions to be satisfied either by hand or, preferably, in a semi-automatic or automatic manner by means of a set of levers or of cams inserted between the controlling press and its slide 12, which, in addition to the association of the three different temperatures for the die, the cover plate and the drawing piston, allows multiple recesses to be drawn to a maximum into various shapes and under various characteristic data in thin sheets of plastic material such as acetate of cellulose the properties of which are also variable.

In the position illustrated in Fig. 10, there is provided a momentary stopping which may last between one and several seconds according to the particular case so as to allow the material to stabilize in its new shape, i. e., to overcome the internal resistances of the material which is plastic per se and is adapted if no stoppage is provided to be submitted to a shrinking, i. e., to an imperfect molding.

This momentary stoppage holding the apparatus in the position corresponding to the end of its stroke is obtained by keeping the slide motionless. As apparent, the cam 29 rotates automatically while the plate 19 is sinking, under the action of its weight and of that of the lever 30 so as to continue contacting with said plate and when the position illustrated in Fig. 10 corresponding to the end of the stroke is reached, the cam is in contact through its uppermost point with the plate 19 so as to lock it in its lower position.

Figure 11:
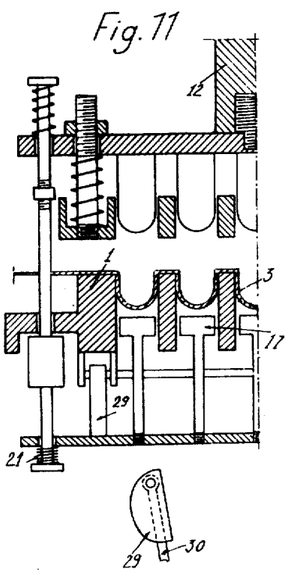

Thus when the slide 12 of the press is raised as shown in Fig. 11, the heating pistons 17 remain in their lower position in which they are locked by the cam 29, while the spring 21 is compressed during operation. The apparatus is then open and it is possible to lift, i. e., to remove the recessed plate from the apparatus, which operation may be executed in two different manners. According to the first manner, the operator releases the cam 29 by acting on the lever 30, and at this moment the heating pistons 17 act as ejecting means; said operation of the lever 30 may also be mechanically connected with the rising movement of the press or else executed by hand if suitable care is exercised. In the second case, the operator raises the recessed sheet 3 by hand when the thinness and brittleness of this sheet does not allow the execution of an automatic or semi-automatic ejection.

It should be noted moreover that when the machine is open, the cold air arriving at high speed on to the sheet 3 and into the impressions produces an instantaneous rigidification of the whole, the rigidity of the sheet being then almost equal to that it will retain when completely cold without this preventing the temperature of the die 1 from being constant.

When the recessed sheet has been raised by hand by the operator, he raises the lever 30 of the cam 29 and the heating pistons 17 return into the position illustrated in Fig. 6 so that the machine is again ready for further operation. The recessed sheet is drawn by hand automatically outside the apparatus through a distance equal to its length and another unimpressed sheet element enters then the position corresponding to the following operation. Of course, the operation may also be executed with independent sheets to be placed in succession inside the machine.

It may be remarked that between the perforated parts 7 of the cover plate and the drawing pistons 9 there exists a small play which allows the cover plate to be laid flat over the sheet of acetate of cellulose so as to exert on it, under the action of the springs 16, a pressure which is equal throughout the surface of the sheet.

In the preceding description, no stress has been laid on the part played by said springs 16 inserted between the cover plate 6 and the carrier plate 10 for the drawing pistons 9. This part is however important; as a matter of fact, said springs exert a gradually increasing pressure on the sheet when the drawing pistons 9 sink and prevent the cover plate from rising during said operation. This prevents consequently the cold air from coming into contact with the sheet which would have for its result the glazing and rigidification of the elements with which the cold air has come into contact. This would result in the instantaneous breaking of the sheet even before the drawing operation is at an end. The strength of the springs 16 is designed consequently so as to properly apply the cover plate 6 on to the die 1, and also so as to exert no greater pressure than is necessary between the flat parts of the matrices and countermatrices in order not to prevent the material elements located at these points from expanding and extending; if such an expanding and extending movement were prevented, it would not be possible to obtain the maximum possible or desired drawing as to depth; the abovementioned designing of the springs should also be such as to prevent too energetic a fastening of the material between two metal surfaces which, as stated, is detrimental to the retention of the transparency of the material. This careful designing is necessary in the case considered as the formation of a multiplicity of deep impressions inside a thin sheet of acetate of cellulose or the like plastic material by reason in particular of the brittleness of the material considered under a small thickness, chiefly when the sheet is hot is difficult; on the other hand, this material is urged simultaneously along opposite directions by the formation of two or four adjacent impressions, in contradistinction with the case of the molding of blanks adapted to receive a single impression, which is a problem quite different from that involved here; lastly, it should be noted that for obtaining the maximum depth for the impression, it is necessary to bring the material to greater thinness wherever it is possible, i. e., as well in front of the flat parts as in front of the impression without which it would not be possible to make the utmost use of all the possibilities of drawing of the material and of its plasticity. It should be noted moreover that the drawing pistons 9 engage the perforated portion of the die 1 with a certain play and the material is consequently not compressed between the outer surface of this piston and the inner edges of the perforated parts 2 of the die 1, the drawing being executed only through the angles of the dies without any rolling of the material. Owing to the play thus provided, it is also possible to execute with the same apparatus impressions in sheets of different thicknesses. If, for instance, there is left a passage or play of $^{12}/_{100}$ of a millimeter between the drawing pistons 9 and the inner surfaces of the perforated parts 2 of the die, it is possible with such a machine to produce impressions in sheets of acetate the thickness of which is under $^{12}/_{100}$ mm. and ranging down to $^{2}/_{100}$ of a millimeter which latter thickness is the smallest which it is possible to produce to this day.

If it is desired to prevent in a perfectly reliable manner the sheet from contacting with the inner edges of the perforated parts 2, said perforated parts may be given a slightly receding shape.

With the machine which forms the object of my invention, there is exerted on the sheets of plastic material controlled pressures which allow at no moment the initiating of folds at any point of the sheet during the drawing operation, which folds would lead to extra thicknesses producing a certain rigidity at various points and preventing the sliding movement of the material, whereby the danger of the sheet breaking would arise.

The drawing or downward stroke is adjustable in accordance with my invention so that it is possible to produce with the same contrivances more or less deep impressions. To this end, there is inserted between the cover plate 6 and the plate 10 carrying the drawing pistons wedges, not shown in the drawing, or else a system of adjustable stops is provided or again the path executed by the slide 12 of the press is limited by any suitable adjustable means.

At the same time, the cam adjusting device, if the apparatus comprises such a device, is also adjusted to this purpose.

Figure 18:
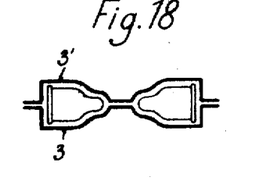
Fig. 18 is a transverse cross-section similar to Fig. 3 relating to the constitution of a fluidtight packing for nursing-bottle caps or nipples.

Under such conditions, the apparatus described may serve for producing, through simple adjustment and without any change in the operating parts, deeply recessed sheets such as those shown in Figs. 1 to 3, as well as less deeply recessed sheets. It is thus possible to produce as illustrated in Fig. 18 for instance, sealed packings for nipples through the coupling of two sheets 3, 3' in view of replacing the simple open cradle members illustrated in Figs. 1 to 3. For passing from one shape to the other, it is sufficient to adjust the elongation of the downward stroke of the drawing pistons 9 to a suitable depth.

In other words, during the operation of the machine, it is designed for the greatest depth which is possible or useful for the drawing, but it may also be used without any essential modifications or transformations for all the depths between the smallest and the greatest. This possibility constitutes a very great advantage. It has been stated for instance that for nipples it is possible to obtain two types of packings which are very different from one another as to appearance and results (compare Fig. 3 and Fig. 18); if it is required to obtain recessed sheets for packing lozenges or the like compressed substances, the method and the machine which form the object of my invention show a still greater interest as it is possible with a given machine to obtain a whole range of recessed sheets stamped to different depths suiting different heights of compressed articles and various manners of packing same. This has been illustrated by way of example in Fig. 19.

It should be noted moreover that the drawing pistons 9 are removable so as to be easily changed and replaced by pistons having differently shaped heads whereby it is possible with the same machine to produce a large number of different shapes for the impression.

Figure 20:
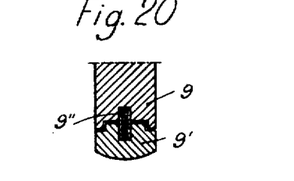
Fig. 20 is a cross-sectional view of a fragment of a drawing piston provided with a removable head.

In a modification illustrated in Fig. 20, instead of providing for the removal of the whole of the piston, only the head 9' is removable; said removable head may be mounted on the piston 9 through any suitable means for instance by means of a sunk screw 9" which allows moreover the eventual adjustment of the depths of the recesses or impressions.

Figures 19, 21, 22, 23, 24, 25:
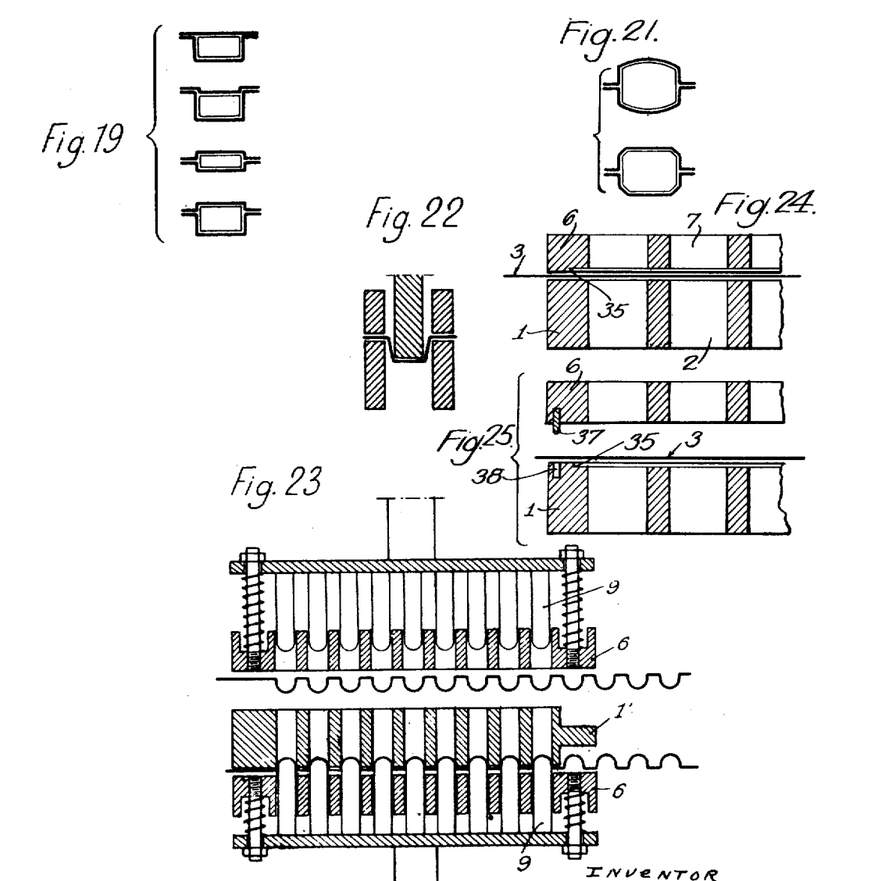
Fig. 19 is a transverse cross-section showing the different depths of the recesses which may be obtained with the same set of drawing pistons through the interposition of wedges or adjustable stops between the piston-carrying plate and the cover plate.
Fig. 21 is a transverse cross-section of two modified forms of impressions which may be obtained by merely changing the heads of the drawing pistons.
Fig. 22 is a cross-sectional view of a part of the machine provided with a drawing piston allowing the obtaining of conical recesses.
Fig. 23 is a vertical cross-section of a modified form of execution of the invention according to which the sheet-stamping apparatus is double-acting.
Fig. 24 is a view similar to Fig. 12 illustrating a modified form of the die and cover plate.
Fig. 25 is a view similar to Fig. 13 illustrating another modified form of the die and cover plate.

By changing the simple removable head 9', it is possible to change from impressions having a large flat bottom area as illustrated in Fig. 19 to impressions having the same diameter or width but provided with differently shaped bottoms suiting the shape of the product to be packed such as an incurved bottom or a bevelled bottom as illustrated in Fig. 21.

It is also possible in accordance with my invention to replace the normal drawing pistons by pistons of smaller diameter 9a (Fig. 22) so as to produce as illustrated in Fig. 22, conically shaped impressions or recesses. Of course, this reduction in diameter may also be obtained very simply by changing the head of the piston as disclosed with reference to Fig. 20.

When flat bottomed impressions are to be produced and always with a view to obtaining the same result as that mentioned, to wit: in order to avoid as far as possible a compression of the material between two metallic surfaces, it is possible to give the lower end of the drawing pistons 9 the shape illustrated in Fig. 16, said lower portion of the pistons including a simple contacting edge 31 engaging the sheet.

When the bottom of the impression or recess is to show receding portions or ribs, the drawing operation is executed only on the angles. It is possible to give the drawing pistons 9 a shape corresponding to Fig. 16 but with a projecting edge 31' which is more marked while the heating piston is provided with a rib 32 allowing the formation in the sheet of a rib 33, the rib 32 being associated therefor with the edge 31' of the piston 9. Thus there are provided above and below the flat bottom of the recess empty spaces 34 which reduce to a minimum the contact between the sheet of material 3 and the pistons 9 and 17. I obtain in this manner perfectly clear impressions which are as transparent as the sheet itself.

When impressions which are easier to execute are to be produced, such as round impressions of comparatively low depth, it is possible to simplify the arrangement used by omitting the heating pistons 17 while the bottom of the die is closed and forms a sufficient hot chamber, as no considerable stress is applied to the sheet of material. It is also possible to simplify the stoppages and the downward speeds, a single heating circuit being sufficient for instance for the movable parts of the arrangement, said circuit affecting either the cover plate or the plate carrying the drawing pistons, of which last two elements, the element not affected by the circuit receives its heat through contact and through radiation.

As already stated, it is necessary that the sheet should not be compressed or held tight at the drawing temperature between two steel parts, however perfect and perfectly polished their surfaces of contact with the sheet of acetate of cellulose may be, if said sheet is to retain its perfect transparency.

From the above, it might seem that when the cover plate has been lowered on to the die 1, the weight of this cover plate to which is added the action of the springs 16 urging the latter downward would cause the material to be held tight between the die and the cover plate and to be consequently in a condition such as would destroy the transparency of the sheet.

As a matter of fact, as explained hereinabove, the pressure exerted by the cover plate is an elastic pressure which may be adjusted to a suitable value by means of the springs 16. But in order to prevent the fastening mentioned hereinabove, the whole surface of the die is slightly depressed as shown at 35 in Fig. 12, except along the four edges of the matrice. This depression of the surface of the die except along its edges is extremely small and may be of the order of one or a few hundredths of a millimeter, but it is sufficient to prevent any pressure of the cover plate on the die; said depression does not prevent however the whole surface of the sheet 3 from remaining in contact with the heated metal. This arrangement has moreover the advantage of allowing the material to slide in a comparatively free manner between the even portions 36 existing between the corresponding perforated portions 2 and 7 of the die and of the coverplate. As the material of the sheet is hot and consequently a little softened, there would be a danger of the sheet breaking if it were held even through a single point between the flat solid portions 36 separating the perforated portions. The arrangement which has just been described allows therefore the sliding of the sheet which receives at the same time the heat necessary for its drawing without said sheet having to bear any weight which might lead to its breaking or which might be detrimental to its transparency. Of course, instead of providing for a recess or depression inside the die as shown in Fig. 12, it is possible to provide this depression inside the cover plate 6.

Such a recess or depression in the die or cover plate, or an equivalent structure, must always be provided in carrying out my invention. The recess 35 was omitted from Figs. 4 and 6 to 11 for reasons of clarity, and is shown in Fig. 12 on a greatly exaggerated scale.

For the obtaining of certain impressions, while providing for the above result, which corresponds in a sense to freedom throughout the sheet except along its outer edges, it is often necessary to control the movement of the edges which have obviously a tendency of receding slightly towards the center of the sheet under the action of the drawing operation.

Figure 13:
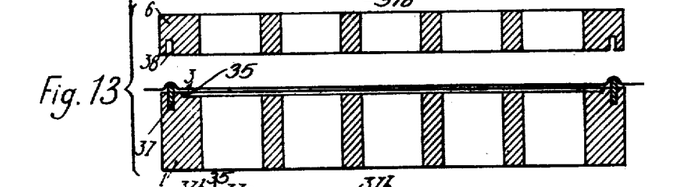
Fig. 13 is a sectional view of another modification.

If the sheets are provided with impressions which should necessarily register with accurately determined locations, it is necessary to be able to hold the edges of the sheet or to control their movement. To this end, as illustrated in Figs. 13 and 14, there is provided all round the die a frame formed by four removable bars 37 engaging corresponding grooves 38 of the cover plate 6. By making these bars project more/or less so as to pinch the outer edge of the sheet 3, it is possible to stop any sliding motion of the edges or else, if required, it is possible to render said sliding motion equal and uniform or to control it.

As the bar is removable, it is possible to take it out and to correct the sliding motion of the edge of the material in accordance with experience until satisfaction is obtained. It is also possible, as stated hereinabove, to wedge the material between the bar 31 and the groove 38 in the cover plate so as to hold said material along its edges or else it is possible to act more or less on the radii so as to allow a more or less considerable sliding motion.

Figure 15:
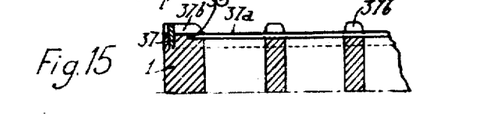
Fig. 15 is a fragmentary sectional view of another form of execution of the die.

As illustrated in Fig. 15, it is possible in certain cases to reduce the height of the bars 37 to almost zero value adjacent the perforated parts of the die 1 as shown at 37a so as to allow the sliding of the material at this point and to further thereby the formation of the bottom of the impression, the material being then held as a whole, along its edges, by the parts 37b of the bar 37.

Although the recess 35 of Fig. 12 is omitted from Figs. 13 to 15, it should be understood that such a recess is nevertheless provided. The function of the rim provided by recess 35 is quite different from the function of the bars 37 and grooves 38. The recess 35 gives the central portions of the sheet freedom of lateral movement between the die 1 and the cover plate 6, so that those portions may be drawn laterally during downward movement of the pistons 9. The bars 37 and grooves 38, on the contrary, grip the edges of the sheet tightly and prevent any lateral movement of the gripped edges. Such lateral movement might otherwise cause the edge of a sheet to move under one or more of the pistons 9, so that the recesses formed thereby would be imperfect. Where gaps are provided in the bars 37, as illustrated in Fig. 15, the remaining portions 37b of the bars are sufficient to prevent the sheet edges from being drawn under the pistons, while the gaps 37a allow the immediately adjacent marginal portions of the sheet to be drawn laterally, thereby providing an additional source of material available for drawing the recesses in the sheet.

It should be noted that when the impressions are very deep it is possible to make the lifting easier by providing small apertures for the entrance of air inside the drawing pistons. This prevents the drawn material from rising with the drawing pistons to which it adheres, in the case of certain impressions.

In the machines of the above described type, an operator, even a woman, may by means of the hand operated press adapted to be actuated by a lever and without the help of an outside force, produce normally for instance 48,000 impressions per hour in the case of impressions having a 16 millimeters spacing between their axes in both directions in sheets of acetate of cellulose the thickness of which is comprised between 3 and $15/100$ of a millimeter with a breaking percentage underneath $1/1000$. With the same machines I obtain impressions which are very near one another and may be spaced through 1 millimeter for instance with a depth of 6 to 7 millimeters in a sheet of material having a thickness of 3 to $15/100$ of a millimeter, the spacing given out hereinabove corresponding also to the requirements in the designing of the matrice.

Of course, the figures given out hereinabove are to be considered as mere examples of an embodiment of the invention for current normal work, and are intended solely to show the advantages afforded by the method and machine forming the object of my invention.

It should be noted that the hot plastic sheet extends over the drawing piston as explains above somewhat after the manner of a rubber sheet, without it being necessary to use any counterpart on the opposite side of the sheet for obtaining the receding parts of the recesses as in the case of the nipples illustrated in Figs. 1 to 3.

The method according to my invention allows also the production of any prints or marks on the impression whatever may be their shape, said marks covering a large portion of the surface of the impression and being produced moreover under very economical conditions.

To this end, the sheets of acetate of cellulose are previously printed flat and the impressions are of course arranged at the suitable location, taking into account the fact that the sheet is submitted to elongation as soon as it comes into contact with the heated machine, the importantance of said elongation depending on the nature of the sheet material.

At the same time as the sheets are printed two or four small holes are formed at the corners of the sheets, these holes serving as references and being adapted to be fitted over spindles of the same diameter which are suitably placed on the die so that the marks may register accurately with the perforated portions of the latter.

As disclosed hereinabove, the drawing pistons acting inside the impressions do not cooperate at any moment with any counterpart inside the die and therefore the marks remain always inside the open hot chamber and cannot ever meet a metal part capable of damaging them.

In this case, the heating pistons 17 are very slightly shifted say through a few tenths of a millimeter, but this is not always necessary as generally their temperature is not sufficient damage the printed marks during the short moment of contact corresponding to the insertion of the sheet inside the machine.

When it is desired to form marks on the flat elements separating the recesses, special arrangements should necessarily be resorted to as the cover plate exerts a more or less considerable pressure on the die and the printed parts would be held more or less tightly between the two metallic parts whereby the prints might be destroyed. To avoid this destruction, it is possible to depress very slightly the die in front of the point which is to receive the marks and to retain only the angles of the perforated parts which alone are necessary; in fact, as disclosed above, the chief feature of the method forming the object of my invention resides in performing a drawing of the material over the angles and not in molding it between two corresponding concave and convex surfaces.

Obviously, it is possible to use the above disclosed features for the execution of a double acting machine including a double series of parts and by means of which it becomes possible to remove one sheet out of one part of the machine during the stoppage provided at the end of the drawing of a second sheet in the other part of the machine.

In Fig. 23 there is shown, by way of example, a double acting form of machine in the simplified case where no heating pistons are required. In such a case, there is used only one double faced die or two dies arranged back to back and which cooperate alternately with two heads including each its cover plate and cooperating drawing pistons and control parts therefor, according to the organization which has been disclosed hereinabove. Such a double acting machine may equally well be horizontal instead of vertical.

Of course, the above described machine which has been illustrated in the drawing has been referred to only by way of example and by no means in a limitative sense. It may be modified in certain details of its execution without the principle of its arrangement being altered thereby. Thus for instance the locking device for the plate 19 carrying the heating pistons which operates at the end of the downward stroke may be different from that which has been illustrated. It is also possible for instance to reverse the operation of certain parts and the cover plate may be made stationary while the die is on the contrary movable and is associated with the displacement of the drawing pistons.

The machine which has been described allows the obtaining of impressions or recesses of any shape and size and they allow the treatment of any plastic material adapted to be shaped when hot and the plastic characteristics of which are similar to those of acetate of cellulose.

What I claim is:

1. An apparatus for simultaneously producing a plurality of adjacently spaced impressions in thin sheets and strips of cellulose acetate and similarly workable thermoplastic materials, comprising a die having openings therein, the outlines of which correspond to the outlines of the impressions to be obtained, a series of drawing pistons having working ends which are of the exact shape and size as the inside dimensions of said impressions, a cover plate having openings therein substantially corresponding to the openings in said die and through which the working ends of said pistons move freely, said die and said plate being supported with the openings thereof in registering relation and positioned to receive a sheet of thermoplastic material between them, means for limiting the minimum spacing between the die and the cover plate so as to permit portions of said sheet adjacent but outside the margins of the die openings to be freely subjected to the drawing action of said pistons, a forming head supporting said pistons in registering relation with the corresponding registering openings in said plate and said die, means for moving said forming head relatively to said die to bring the working ends of said pistons into drawing relation with a sheet disposed between said plate and said die, a series of heating pistons adapted to reciprocate within the openings of the die and the outlines of which substantially correspond to those of said openings, a common control member connected to said heating pistons, and said control member being yieldably connected with the forming head supporting said drawing pistons, whereby said heating pistons are movable in coordinated relation to the movements of said drawing pistons.

2. An apparatus for simultaneously producing a plurality of adjacent spaced impressions in thin sheets and strips of cellulose acetate and similarly workable thermoplastic materials, comprising a double-faced die having openings extending therethrough, the outlines of which correspond to the outlines of the impressions to be obtained, two series of drawing pistons having working ends which are of the exact shape and size as the inside dimensions of said impressions, a pair of cover plates having openings therein substantially corresponding to the openings in said die and through which the working ends of said series of pistons are adapted to move freely, one of said cover plates and one of said series of pistons being positioned on each side of said die, a pair of forming heads supporting said two series of pistons in registering relation with the registering openings in said plates and said die with the respective cover plates interposed between said forming heads and said die, and means for moving said forming heads alternately toward and away from said die to bring the working ends of the respective series of pistons into drawing relation with sheets of thermoplastic material disposed on the opposite sides of said die between said die and said respective cover plates.

3. An apparatus for simultaneously producing a plurality of adjacently spaced impressions in thin sheets and strips of cellulose acetate and similarly workable thermoplastic materials, comprising a heated die having openings therein, the outlines of which correspond to the outlines of the impressions to be obtained, a series of drawing pistons having working ends which are of the exact shape and size as the inside dimensions of said impressions, a heated cover plate having openings therein substantially corresponding to the openings in said die and through which the working ends of said pistons move freely, said die and said plate being supported with the openings thereof in registering relation and in position to receive a sheet of thermoplastic material between them, a series of heating pistons positioned in registering relation to said die openings and supported for reciprocation within said openings in opposed coordinated relation to said drawing pistons, a forming head supporting said drawing pistons in registering relation to the corresponding registering openings in said heated cover plate and said die, said head and said die being relatively movable to bring the working ends of said drawing pistons simultaneously into drawing relation to the sheet disposed between said plate and said die, said cover plate being yieldably connected to said forming head and movable therewith into contact with a thermoplastic sheet positioned on said die in advance of drawing contact of said pistons with said sheet, and said cover plate in its covering contact position cooperating with said die, said drawing pistons and said heating pistons, to define a substantially closed heated chamber substantially filled by said thermoplastic sheet.

4. An apparatus for simultaneously producing a plurality of adjacently spaced recesses in thin sheets of cellulose acetate and similarly workable thermoplastic materials, comprising a die having a plurality of adjacently spaced openings therein, a series of drawing pistons arranged for movement into and out of said openings and having working ends which are of the exact shape and size as the inside dimensions of said recesses, and each of said pistons having the external surfaces thereof spaced from the side walls of the die openings a distance at least equal to the thickness of the thermoplastic sheet being formed therein, a cover plate having a plurality of adjacently spaced openings therein substantially corresponding to the openings in said die and through which the working ends of said pistons are adapted to move freely, said die and said plate being supported with the openings thereof in registering relation and in position to receive a sheet of thermoplastic material between them, means carried by said die and extending outwardly beyond the face thereof toward said cover plate for engaging the marginal portions of said sheet and pressing said marginal portions into holding engagement with opposed marginal portions of said cover plate, a rim extending outwardly for a sufficient distance from the face of said die to prevent the cover plate from applying substantial pressure to a sheet interposed between the cover plate and the die except at the marginal portions thereof, means for heating said sheet while it is being held between said die and said cover plate, and said pistons and said die being relatively movable to bring the working ends of said pistons simultaneously into drawing relation to said sheet of thermoplastic material.

5. An apparatus for simultaneously producing a plurality of recesses in a thin thermoplastic sheet, comprising a die, a cover plate for said die, said die and cover plate having opposed sheet-engaging surfaces and a plurality of opposed pairs of openings extending inwardly from said surfaces, said openings having outlines corresponding to the recesses to be produced, a plurality of drawing pistons received in said cover plate openings and having working ends conforming to said recesses and disposed toward the sheet-engaging surface of said die, means for producing relative movement of the plate and die so as to bring said sheet-engaging surfaces into juxtaposition with the adjacent sides of a sheet of thermoplastic material placed between the plate and die with the openings of the plate and die in registry, said surfaces of said die and said cover plate being adapted to cover substantially all of the sheet except the portions aligned with the openings, means for heating the plate, the die and the pistons so that the sheet is rendered plastic when adjacent thereto, means for moving the pistons through the plate and die openings so that said working ends engage the sheet and draw it to form the recesses, said die openings being deeper than the travel of the pistons therein so that the sheet is not pressed during formation of the recesses, and means for limiting the minimum spacing between the sheet-engaging surfaces of the die and cover plate so as to permit portions of the sheet engaged thereby to be stretched by the drawing action of the pistons.

6. An apparatus for simultaneously producing a plurality of recesses in a thin thermoplastic sheet, comprising a die, a cover plate for said die, said die and cover plate having opposed, sheet-engaging surfaces and a plurality of opposed pairs of openings extending inwardly from said surfaces, said openings having outlines corresponding to the recesses to be produced, a plurality of drawing pistons received in said cover plate openings and having working ends comforming to said recesses and disposed toward the sheet-engaging surface of said die, means for producing relative movement of the plate and die so as to bring said sheet-engaging surfaces into juxtaposition with the opposite sides of a sheet of thermoplastic material placed between the plate and die with the openings of the plate and die in registry, said surfaces being adapted to cover substantially all of the sheet except the portions aligned with the openings, means for separately heating the plate and the pistons so that the sheet is rendered plastic when adjacent thereto, means for separately controlling the temperatures produced by said separate heating means, means for moving the pistons through the plate and die openings so that said working ends engage the sheet and draw it to form the recesses, said die openings being deeper than the travel of the pistons therein so that the sheet is not pressed during formation of the recesses, and means for limiting the minimum spacing between the sheet engaging surfaces of the die and cover plate so as to permit portions of the sheet in engagement therewith to be stretched by the drawing action of the pistons.

7. An apparatus for simultaneously producing a plurality of recesses in a thin thermoplastic sheet, comprising a die, a cover plate for said die, said die and cover plate having opposed sheet-engaging surfaces and a plurality of opposed pairs of openings extending inwardly from said surfaces, said openings having outlines corresponding to the recesses to be produced, a plurality of drawing pistons received in said cover plate openings and having working ends conforming to said recesses and disposed toward the sheet-engaging surface of said die, means for producing relative movement of the plate and die so as to bring said sheet-engaging surfaces into juxtaposition with the opposite sides of a sheet of thermoplastic material with the openings of the plate and die in registry, said surfaces being adapted to cover substantially all of the sheet except the portion aligned with the openings, and means for heating the plate, the die and the pistons so that the sheet is rendered plastic when adjacent thereto, said movement-producing means comprising means for moving the pistons and spring means connecting the piston-moving means and the plate so that said pistons and plate move together until the plate is stopped by the die, whereupon the pistons move through the plate and die openings so that said working ends engage the sheet and draw it to form the recesses, said die openings being deeper than the travel of the pistons therein so that the sheet is not deformed by pressing during formation of the recesses, a rim extending around the periphery of one of said surfaces so as to limit the minimum spacing of the central portions of said surfaces and thereby permit the central portions of the sheet to be freely stretched by the drawing action of the pistons, said spring means being effective to control the pressure between said rim and the other sheet-engaging surface so as to increase said pressure as the drawing action proceeds.

8. An apparatus for simultaneously producing a plurality of recesses in a thin thermoplastic sheet, comprising a die, a cover plate for said die, said die and cover plate having opposed, sheet-engaging surfaces and a plurality of opposed pairs of openings extending inwardly from said surfaces, said openings having outlines corresponding to the recesses to be produced, a plurality of drawing pistons received in said cover plate openings and having working ends conforming to said recesses and disposed toward the sheet-engaging surface of said die, means for producing relative movement of the plate and die so as to bring said surfaces into juxtaposition with the opposite sides of a sheet of thermoplastic material placed between the plate and die with the openings of the plate and die in registry, said surfaces being adapted to cover all of the sheet except the portions aligned with the openings, means for heating the plate, the die and the pistons so that the sheet is rendered plastic when adjacent thereto, means for moving the pistons through the plate and die openings so that said working ends engage the sheet and draw it to form the recesses, said die openings being deeper than the travel of the pistons therein so that the sheet is not deformed by pressing, mean for limiting the minimum spacing of the central portions of the sheet-engaging surfaces from each other to a value of the same order to magnitude as the normal thickness of the sheet so as to permit the central portions of the sheet between said surfaces to be stretched by the drawing action of the pistons, and means for tightly gripping the edge portions of the sheet between the die and the cover plate to prevent lateral movement thereof during said drawing action.

9. An apparatus for simultaneously producing a plurality of recesses in a thin thermoplastic sheet, comprising a die, a cover plate for said die, said die and cover plate having opposed sheet-engaging surfaces and a plurality of opposed pairs of openings extending inwardly from said surfaces, said openings having outlines corresponding to the recesses to be produced, a plurality of drawing pistons received in said cover plate openings and having working ends conforming to said recesses and disposed toward the sheet-engaging surface of said die, means for producing relative movement of the plate and die so as to bring said sheet-engaging surfaces into juxtaposition with the opposite sides of a sheet of thermoplastic material placed between the plate and the die with the openings of the plate and die in registry, means for heating the plate, the die and the pistons so that the sheet is rendered plastic when adjacent thereto, means for moving the pistons through the plate and die openings so that said working ends engage the sheet and draw it to form the recesses, said die openings being deeper than the travel of the piston therein so that the sheet is not deformed by pressing, and a rim extending around a major portion of the periphery of one of said surfaces so as to limit the minimum spacing of the central portions of said surfaces to a value of the same order of magnitude as the normal thickness of the sheet and thereby permit portions of the sheet between said central portions of said surfaces to be freely stretched by the drawing action of the pistons.

10. An apparatus for producing a recess in a thin thermoplastic sheet, comprising a die, a cover plate for said die, said die and cover plate having opposed, sheet-engaging surfaces and opposed openings extending inwardly from said surfaces, said openings having outlines corresponding to the recesses to be produced, drawing pistons received in said cover plate openings and having their working ends conforming to said recesses and disposed toward the sheet-engaging surface of said die, heating pistons received in said die openings, said heating pistons being biased to positions in which their ends are aligned with the sheet-engaging surface of the die, means for producing relative movement of the plate and die so as to bring said sheet-engaging surfaces into juxtaposition with the opposite sides of a sheet of thermoplastic material placed between the plate and die with the openings of the plate and die in registry, said plate, die and pistons forming a substantially closed chamber for receiving said sheet, means for heating the plate, the die and the pistons so that the sheet is rendered plastic when received in said chamber, means for moving the drawing pistons through the plate and die openings so that said working ends engage the sheet and draw it to form the recesses and means for moving the heating pistons in coordinated relation to the movements of the drawing pistons.

11. An apparatus for simultaneously producing a plurality of recesses in a thin thermoplastic sheet, comprising a die, a cover plate for said die, said die and cover plate having opposed, sheet-engaging surfaces and a plurality of opposed pairs of openings extending inwardly from said surfaces, said openings having outlines corresponding to the recesses to be produced, a plurality of drawing pistons received in said cover plate openings and having working ends conforming to said recesses and disposed toward the sheet-engaging surface of said die, a plurality of heating pistons received in said die openings, said heating pistons being biased to positions in which their ends are aligned with the sheet-engaging surface of the die, means for producing relative movement of the plate and die so as to bring said surfaces into juxtaposition with the opposite sides of a sheet of thermoplastic material placed between the plate and die with the openings of the plate and die in registry, said plate, die and pistons forming a substantially closed chamber for receiving said sheet, means for heating the plate, the die and the pistons so that the sheet is rendered plastic when received in said chamber, means for moving the drawing pistons through the plate and die openings so that said working ends engage the sheet and draw it to form the recesses, means for moving the heating pistons in coordinated relation to the movements of the drawing pistons, and means for limiting the minimum spacing between the sheet-engaging surfaces of the die and cover plate so as to permit portions of the sheet between the surfaces to be stretched by the drawing action of the pistons.

12. An apparatus for simultaneously producing a plurality of recesses in a thin thermoplastic sheet, comprising a die, a cover plate for said die, said die and cover plate having opposed, sheet-engaging surfaces and a plurality of opposed pairs of openings extending inwardly from said surfaces, said openings having outlines corresponding to the recesses to be produced, a plurality of drawing pistons received in said cover plate openings and having working ends conforming to said recesses and disposed toward the sheet-engaging surface of said die, a plurality of heating pistons received in said die openings, said heating pistons being biased to positions in which their ends are aligned with the sheet-engaging surface of the die, means for producing relative movement of the plate and die so as to bring said surfaces into juxtaposition with the opposite sides of a sheet of thermoplastic material placed between the plate and die with the openings of the plate and die in registry, said plate, die and pistons forming a substantially closed chamber for receiving said sheet, means for heating the plate, the die and the pistons so that the sheet is rendered plastic when received in said chamber, means for moving the drawing pistons through the plate and die openings so that said working ends engage the sheet and draw it to form the recesses, means for moving the heating pistons in coordinated relation to the movements of the drawing pistons so as to withdraw the heating pistons from contact with the sheet just before the sheet is engaged by the drawing pistons, and means for limiting the minimum spacing between the sheet-engaging surfaces of the die and cover plate so as to permit portions of the sheet between said surfaces to be stretched by the drawing action of the pistons.

13. An apparatus for simultaneously producing a plurality of adjacent spaced impressions in thin sheets of cellulose acetate and similarly workable thermoplastic materials, comprising a substantially planar faced die having a plurality of adjacently spaced openings extending in parallel relation inwardly from said planar face thereof, said openings having outlines corresponding to the outlines of the impressions to be produced, a substantially plane surfaced cover plate for said die substantially coextensive with the planar face thereof and having a plurality of openings therethrough conforming as to contour, size and spacing to the openings in said die, said die and said plate being supported with the openings thereof in registering relation and for movement toward and away from one another to receive a sheet of thermoplastic material between them and cooperating to substantially enclose said sheet, a plurality of drawing pistons having working ends conforming to said impressions and disposed in registering relation with the openings in said cover plate and die with the working ends disposed toward said die, means for bringing said plane surface of said cover plate into yielding engagement with one surface of a sheet of thermoplastic material when the latter is disposed in drawing position in said die, means for heating said sheet while enclosed by said die and cover plate, means for simultaneously moving said pistons through the openings in said cover plate into the openings in said die so that said working ends engage the sheet and draw it to form said impressions, and means for limiting the minimum spacing of the sheet engaging portions of the die and cover plate so as to permit the portions of the sheet in contact therewith to be freely subjected to the drawing action of said pistons.

14. An apparatus as defined in claim 8, in which said gripping means comprises removable bars received in grooves in said die and adapted to engage mating grooves in the cover plate as the latter is moved down upon the die.

15. An apparatus as defined in claim 14, in which the height of the bars is reduced adjacent the openings in the die.

CHARLES NICOLLE.

REFERENCES CITED

The following references are of record in the file of this patent:

UNITED STATES PATENTS

| Number | Name | Date |
|---|---|---|
| 600,863 | Genese | Mar. 22, 1898 |
| 699,331 | Thurber | Mar. 5, 1901 |
| 1,318,700 | Skolnick | Oct. 14, 1919 |
| 1,531,504 | Roberts | Mar. 31, 1925 |
| 1,667,673 | Pierson et al. | Apr. 24, 1928 |
| 1,879,555 | Simmons | Sept. 27, 1932 |
| 1,904,268 | Bronson | Apr. 18, 1933 |
| 2,172,546 | Riel | Sept. 12, 1939 |
| 2,190,807 | Steinberger | Feb. 20, 1940 |
| 2,255,116 | Helmstaedter | Sept. 9, 1941 |
| 2,255,117 | Helmstaedter | Sept. 9, 1941 |
| 2,270,187 | Dulmage | Jan. 13, 1942 |
| 2,285,903 | Clark | June 9, 1942 |
| 2,295,066 | Weikert | Sept. 8, 1942 |
| 2,403,482 | Cloud | July 9, 1946 |